United States Patent
Yamamoto et al.

(10) Patent No.: US 8,463,272 B2
(45) Date of Patent: Jun. 11, 2013

(54) WIRELESS COMMUNICATION SYSTEM AND LOAD BALANCING AWARE HANDOVER METHOD THEREFOR

(75) Inventors: Tomonori Yamamoto, Fujisawa (JP); Satoshi Tamaki, Yokohama (JP); Rintaro Katayama, Fujisawa (JP); Hirotake Ishii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 115 days.

(21) Appl. No.: 12/985,469

(22) Filed: Jan. 6, 2011

(65) Prior Publication Data

US 2011/0244866 A1 Oct. 6, 2011

(30) Foreign Application Priority Data

Mar. 31, 2010 (JP) .................................. 2010-080126

(51) Int. Cl.
*H04W 36/00* (2009.01)
(52) U.S. Cl.
USPC ........... 455/438; 455/436; 455/437; 455/443; 455/444; 455/448; 455/449; 455/450; 455/452.1; 455/452.2; 455/453; 455/509; 455/63.1; 455/63.2; 455/522; 370/328; 370/329; 370/330; 370/331; 370/332; 370/333
(58) Field of Classification Search
USPC ................. 455/436–444, 453, 448, 449, 450, 455/451, 452.1, 452.2, 509, 63.1, 63.2, 522; 370/328–333
See application file for complete search history.

(56) References Cited

U.S. PATENT DOCUMENTS

| | | | | |
|---|---|---|---|---|
| 5,912,884 A * | 6/1999 | Park et al. | ...................... | 370/331 |
| 6,654,608 B1 * | 11/2003 | Monell et al. | .................. | 455/436 |
| 6,671,512 B2 * | 12/2003 | Laakso | .......................... | 455/453 |
| 7,016,686 B2 * | 3/2006 | Spaling et al. | ................ | 455/453 |
| 2004/0229621 A1 * | 11/2004 | Misra | ............................. | 455/445 |
| 2006/0128394 A1 * | 6/2006 | Turina et al. | ................... | 455/453 |
| 2006/0166677 A1 * | 7/2006 | Derakshan et al. | ........... | 455/453 |

(Continued)

FOREIGN PATENT DOCUMENTS

| | | |
|---|---|---|
| EP | 2217021 | 8/2010 |
| JP | 2009118016 | 5/2009 |
| WO | WO 2009099224 A1 * | 8/2009 |

OTHER PUBLICATIONS

IEEE Std 802.16, "IEEE Standard for Local and Metropolitan Are Networks, Part 16: Air Interface for Broadband Wireless Access Systems," IEEE Computer Society and the IEEE Microwave Theory and Techniques Society, 2009, pp. 707-714.

*Primary Examiner* — Olumide T Ajibade Akonai
(74) *Attorney, Agent, or Firm* — Antonelli, Terry, Stout & Kraus, LLP.

(57) ABSTRACT

An object of the invention is to provide a wireless communication system in which the load of each cell and interference between cells are taken into account. In a handover-candidate base station and a handover-source base station, parameters for interference-reducing scheduling and handover facilitating processing are adjusted based on the mutual load information. When the handover-candidate base station, to be used for load balancing, is a large-diameter cell, transmit power control and frequency scheduling are adjusted by taking account of the load state at a cell edge. When the handover-source base station has a small-diameter cell, the number of terminals to be handed over is adjusted by taking account of the load state of the handover-candidate base station. Thus, both of interference control and load balancing are achieved.

13 Claims, 12 Drawing Sheets

U.S. PATENT DOCUMENTS

| | | | |
|---|---|---|---|
| 2007/0008929 A1* | 1/2007 | Lee et al. | 370/331 |
| 2007/0173256 A1* | 7/2007 | Laroia et al. | 455/436 |
| 2009/0197631 A1* | 8/2009 | Palanki et al. | 455/522 |
| 2009/0291690 A1* | 11/2009 | Guvenc et al. | 455/444 |
| 2010/0254344 A1* | 10/2010 | Wei et al. | 370/330 |
| 2011/0019641 A1* | 1/2011 | Chang et al. | 370/331 |
| 2011/0111766 A1* | 5/2011 | Yang et al. | 455/452.2 |

* cited by examiner

FIG. 12

SCHEDULING MODE TABLE 1200

| OVERLOAD LEVEL 1210 | TARGET TRANSMIT POWER 1220 | RESOURCE ASSIGN NUMBER 1230 |
|---|---|---|
| LIGHT (1250) | DOWN | UP |
| MIDDLE (1260) | DOWN/- | UP/- |
| HEAVY (1270) | - | - |

FIG. 13

| 1300 | TARGET CELL 1 | TARGET CELL 2 | TARGET CELL 3 |
|---|---|---|---|
| PATHLOSS (1310) | 100 | 96 | 92 |
| OVERLOAD LEVEL (1330) | LOW (-5) | HIGH (+5) | HIGH (+5) |
| EFFECTIVE PATHLOSS (1350) | 95 | 101 | 97 |

WIRELESS COMMUNICATION SYSTEM AND LOAD BALANCING AWARE HANDOVER METHOD THEREFOR

CLAIM OF PRIORITY

The present application claims priority from Japanese patent application JP 2010-080126 filed on Mar. 31, 2010, the content of which is hereby incorporated by reference into this application.

FIELD OF THE INVENTION

The present invention relates to a wireless communication system that includes a plurality of base stations, to a base station, and to a technology for managing base stations.

BACKGROUND OF THE INVENTION

A third-generation cellular wireless communication system using CDMA (Code Division Multiple Access) allows multimedia information communications via an IP network, and there is a growing need for more broadband and higher-speed communication services. It is expected that supports for broadband communications become common, such as, best-effort data communications, VoIP voice communications, and distribution of video and other streaming information. With such diversification of the usage scenes, there is a growing need for more broadband and higher speed services. In terms of broadband and high speed, an OFDMA wireless communication system attracts attention, as a next-generation wireless communication system after CDMA.

The OFDMA is a technology for improving the frequency usage efficiency by orthogonally multiplexing a plurality of orthogonal carrier waves in the frequency domain. Cellular wireless communication systems using OFDMA are positioned as beyond 3rd-generation cellular wireless communication systems, and representative specifications thereof are LTE (Long Term Evolution) and UMB (Ultra Mobile Broadband). These are globally standardized by business organizations such as 3GPP (3rd Generation Partnership Project) and 3GPP2.

In wireless communication systems, it is known that, to wireless access that connects a terminal and a base station, wireless wave interference from an adjacent base station (cell) and a terminal belonging, to the adjacent base station is fatal. In particular, in OFDMA wireless communication systems, it is known that a large influence is caused by interference from an adjacent base station (cell), and thus it is very difficult to design an arrangement of base stations.

In wireless access from a cell edge that is the border between areas covered by base stations, the interference power level from an adjacent cell is close to the desired signal level from the own cell, and this substantially causes a deterioration in SINR (signal to interference and noise power ratio), which is an index indicating the channel quality.

Reducing interference between adjacent cells is very important to improve the channel capacity for wireless access in the whole system. To reduce interference between adjacent cells, the most important thing is not to transmit excess power. However, when the power is strongly suppressed, there arise problems such as a reduction in cover area (cell diameter) and a reduction in transmission speed. Therefore, it is necessary to specify excess power and to reduce the power.

As a countermeasure against interference between adjacent cells, there is a technology called FFR (fractional frequency reuse), in which frequency bands at which transmission can be performed at high power are individually allocated to the cells and are used to cover terminals located at the cell edges (the edges of the cells). In mobile WiMAX, a channel format is defined in which the frequency is divided into three and used (IEEE Standard for Local and metropolitan area networks Part 16: Air Interface for Broadband Wireless Access Systems (IEEE Std 802.16 TM-2009), 29 May 2009). In FFR, processing of allocating high-power radio resources is performed by a scheduler provided in a base station. Therefore, the scheduler needs to be operated by always taking account of the cell edge and the cell center. FFR is effective for both the downlink and uplink in wireless access.

In addition, in an uplink operation in wireless access, transmit power control for a terminal located at the cell edge is also closely related to the interference control. The terminal located at the cell edge requires high transmission power in order to overcome path loss with respect to the base station. To suppress this power, it is necessary to allocate more radio resources to reduce the encoding ratio of error-correcting code. By reducing the power, interference is reduced, but the frequency-resource use rate is increased, thus increasing the load in wireless access. JP-A-2009-118016 describes a technology for changing a frequency resource use method in wireless access according to the access load of the own cell.

In addition to the above-described consideration for a reduction in interference in wireless access, it is also important to control load balancing between cells at a location where terminal connections are concentrated. If the load exceeds the throughput of the backbone of a base station, this makes it difficult to establish a call connection. In view of wireless access and backbone throughput, a study has been conducted in order to balance the load levels between cells.

As shown in FIG. 2, base stations vary in cell size and in the number of accommodated terminals, depending on the installation site and the intended use. For example, in an urban area and the like, terminals are densely located, and thus it is difficult to accommodate those terminals by just using a base station having a large cell, such as a macrocell, in terms of the load of the base station. Therefore, smaller base stations having cells smaller than that of the macrocell 201-$a$, such as microcells and picocells, are dotted to support the macrocell. Hereinafter, the magnitude of transmission power of a base station is defined as the size of the cell. Further, a base station having a cell larger than another is defined as a macrocell, and a base station having a cell smaller than the macrocell is defined as a picocell, and these descriptions are used.

As described above, a picocell is installed particularly at a location where the terminal connection load is concentrated. Therefore, if load control is not appropriately performed, the load is heavily imposed on the picocell 201-$b$, and the load is lightly imposed on the macrocell 201-$a$. As shown in FIG. 3, there may be a large difference in the number of terminal connections between adjacent base stations.

In order to balance the terminal connection load, handover from the picocell to the macrocell is facilitated. A terminal that has been handed over from the picocell to the macrocell is located at a cell edge of the macrocell, which is the handover destination. The terminal requires higher transmission power to overcome the path loss with respect to the macrocell base station. In other words, when the terminal is handed over from the picocell to the macrocell for the purpose of the load balancing, this influences the picocell as large interference.

SUMMARY OF THE INVENTION

An object of the present invention is to provide a wireless communication system in which the load of each cell and interference between cells are taken into account.

In order to solve at least one of the above-described problems, according to an aspect of the present invention, there is provided a wireless communication system that includes at least two base stations having different communication ranges, in which one of the base stations controls, when handover of a terminal is performed, the handover based on the load information of the other base station.

According to another aspect, a handover-candidate base station and a handover-source base station perform handover facilitating processing based on the mutual load information.

According to still another aspect, a handover-destination base station performs at least one of transmit power control and frequency scheduling while taking account of the load state of its cell edge. Further, the handover-target base station has a communication range larger than that of the handover-source base station.

According to still another aspect, when the handover-source base station has a communication range smaller than that of the handover-destination base station, the number of terminals to be handed over is determined by taking account of the load state of the handover-target base station.

According to any one of the aspects of the present invention, the load balancing can be performed according to the characteristics of the base stations.

BRIEF DESCRIPTION OF THE DRAWINGS

FIG. 12 is a diagram showing a scheduling mode table that holds the amount of resource allocation and the amount of power control according to a load level;

FIG. 13 is a diagram for explaining how to change a handover criterion value from load information and quality information;

DETAILED DESCRIPTION OF THE PREFERRED EMBODIMENTS

Embodiments according to the present invention will be described.

First Embodiment

A cellular wireless communication system of this embodiment uses orthogonal frequency division multiple access (OFDMA), for example. In this embodiment, wireless communication system optimizing control, such as load balancing between adjacent base stations and interference control between cells, is performed.

Figure 1:
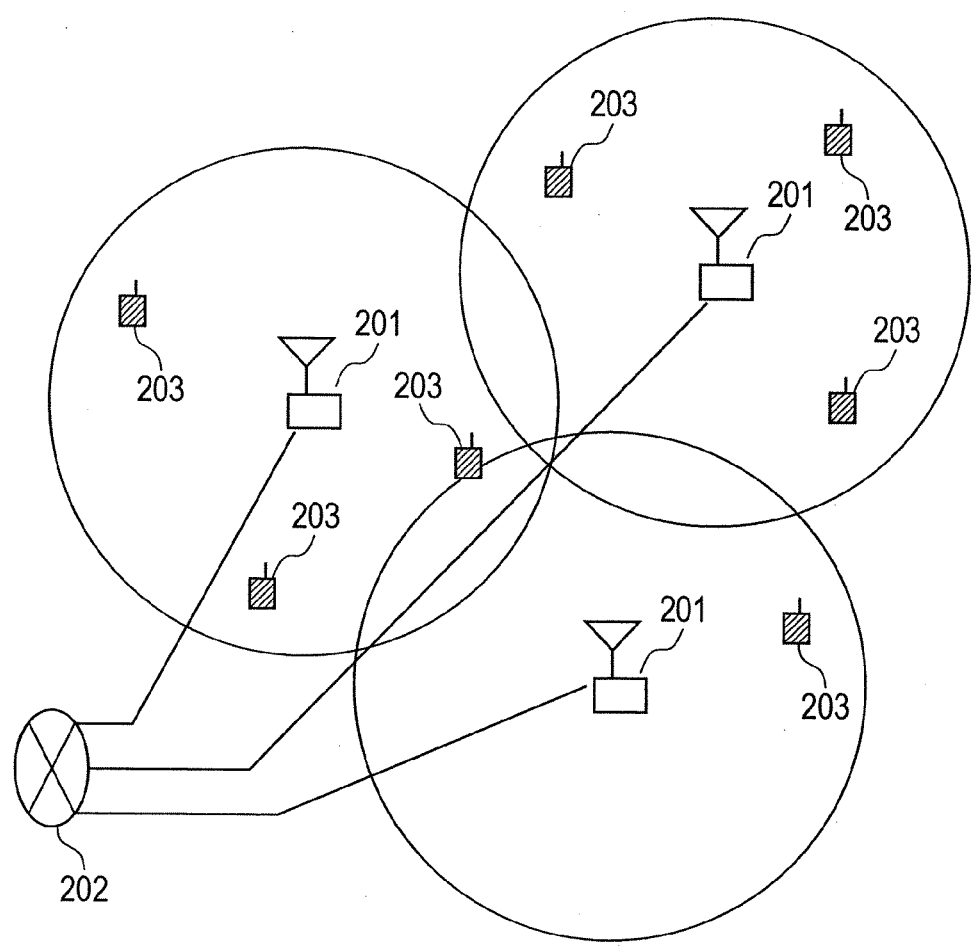
FIG. 1 is a diagram for explaining a general wireless system.
Figure 2:
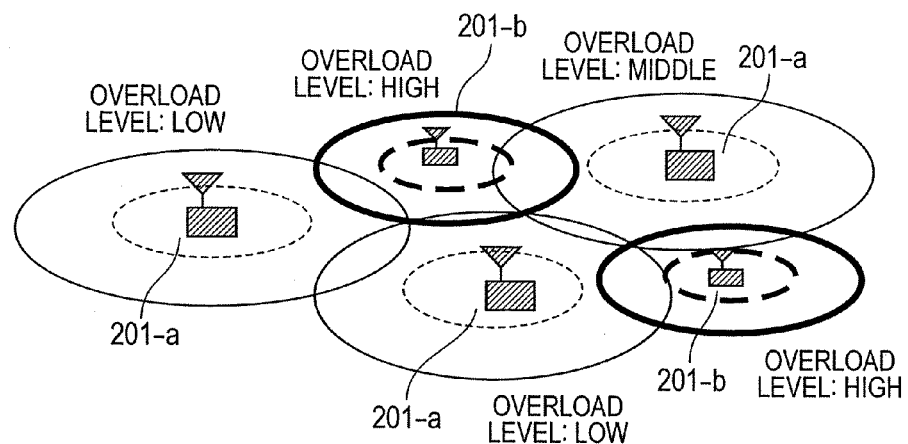
FIG. 2 is a diagram for explaining the arrangement of wireless base stations and imbalances in load and cell diameter.
Figure 3:
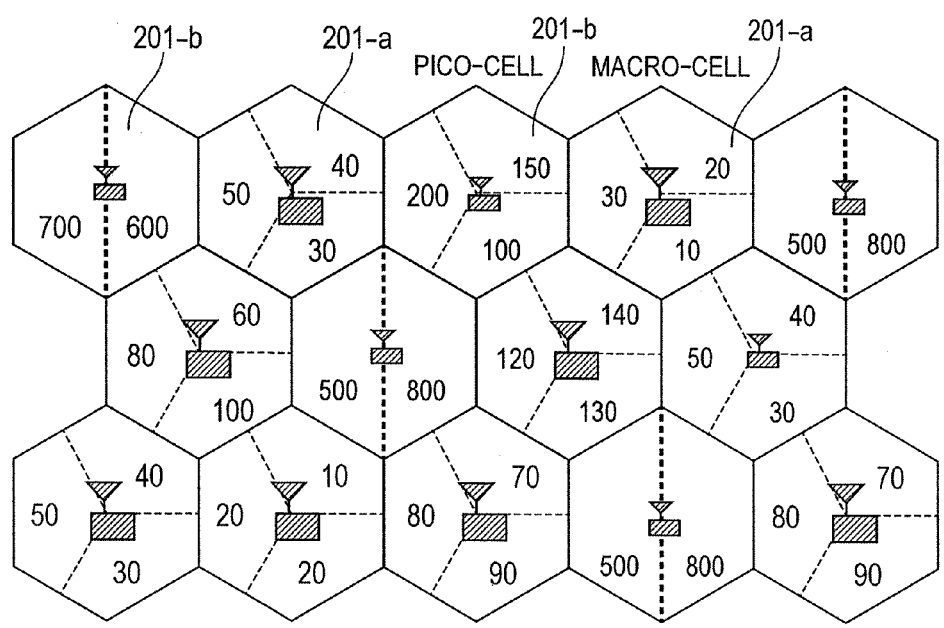
FIG. 3 is a diagram for explaining the load states of wireless base stations for which load balancing control is not performed.

The configuration of the cellular wireless communication system will be described using FIG. 1. In the cellular wireless communication system, a wireless base station covers an area called a cell. The cell is called a macrocell, a microcell, a picocell, or a femtocell, depending on the size of its cover range and the type of its function. Among base stations 201 of the cellular wireless communication system, one that covers the largest area is also called a macrocell base station 201-*a* and accommodates mobile stations 203 located in a range of approximately several hundred meters to several thousand meters. The base stations 201 are connected to a base-station upper-layer device 205 via a mobile network 202. Through the base-station upper-layer device 205, it is possible to establish a communication with an IP network or to connect a call between mobile stations 203 located at positions away from each other.

Figure 4:
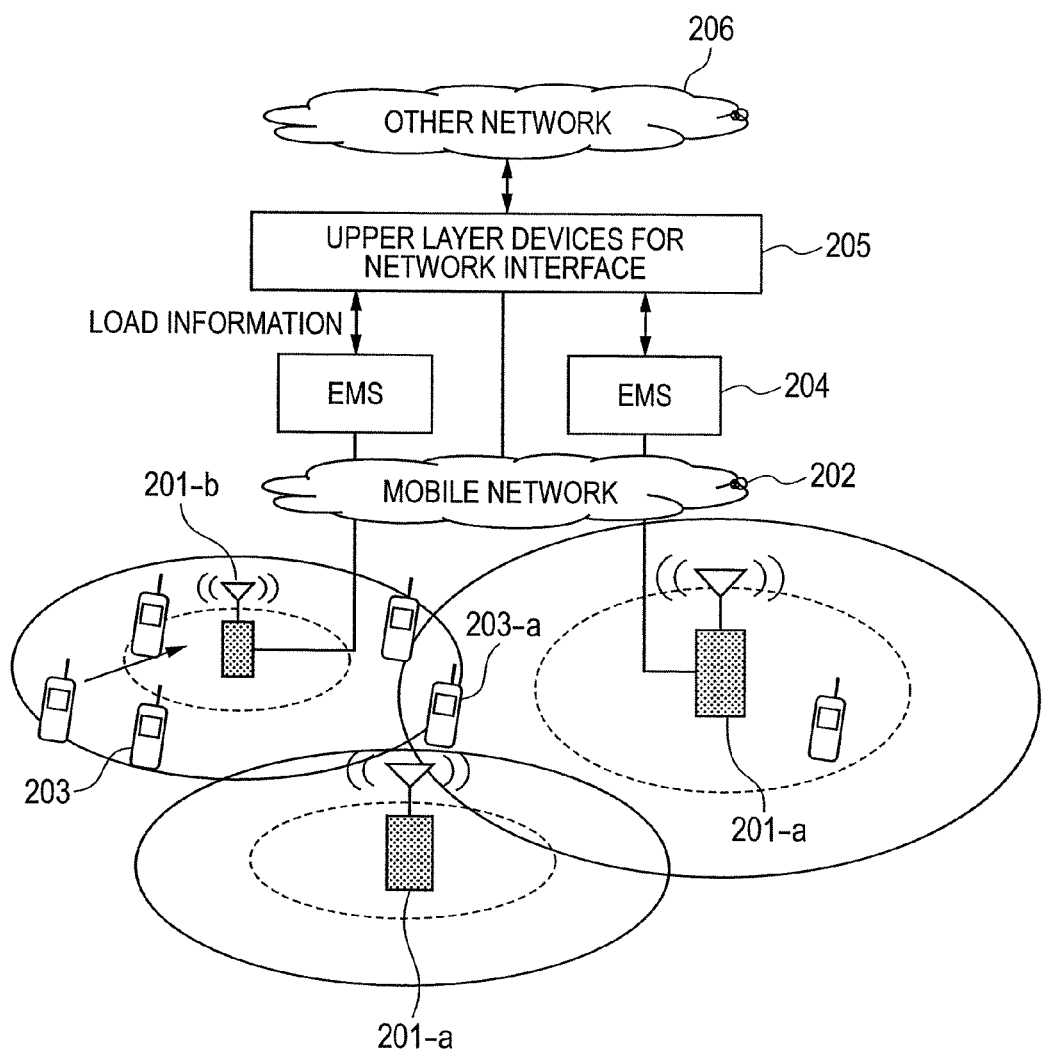
FIG. 4 is a diagram for explaining the configuration of a system according to this embodiment.

FIG. 4 is a diagram of the configuration of the wireless communication system according to this embodiment. The wireless communication system includes a base station (serving cell) 201-*b* to which a certain terminal currently belongs, handover-candidate base stations (target cells) 201-*a*, and EMS (element management system) servers 204 serving as base station management devices, and the base-station upper-layer device 205. The base-station upper-layer device 205 is, for example, a gateway or an MME (mobility management entity). Note that the base stations may be connected to each other via a wired network or a wireless network.

In this embodiment, a description is given of a case where the serving cell having a heavy load is a picocell, and a target cell having a light load is a macrocell. Handover is performed from the picocell to the macrocell for load balancing.

Figure 5:
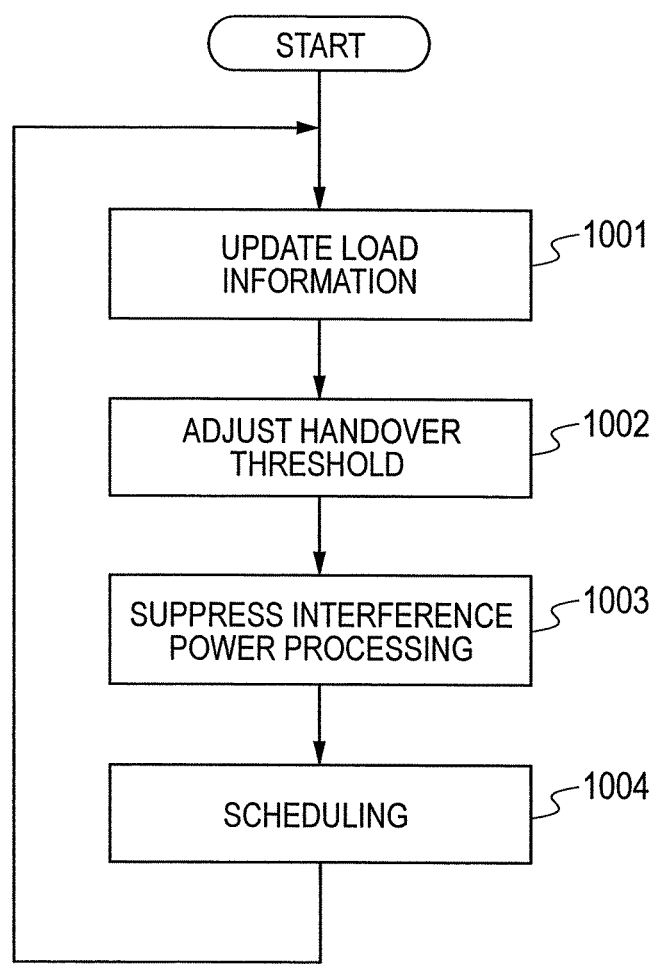
FIG. 5 is a flowchart for explaining the outline of this embodiment.

FIG. 5 is a flowchart showing the outline of this embodiment. In Step 1001, load information of both of the picocell and the macrocell is updated. The load information may be updated autonomously by both of the picocell and macrocell base stations. Alternatively, the base station management devices 204 may gather the load information from each base station and update it. For example, the load may be judged from the hardware use rate, the radio resource use rate, or the number of terminal connections. In Step 1002, processing of adjusting handover threshold from the picocell to the macrocell is performed. The processing of this step is performed when the picocell and the macrocell each adjust a parameter related to handover. In Step 1003, transmit power control for a terminal is performed to suppress interference power. In Step 1004, in order to prevent deterioration in communication quality, wireless-frequency scheduling is performed for the terminal whose transmission power has been controlled to suppress interference power in Step 1003. Step 1003 and Step 1004 are performed by the macrocell base station.

Figure 6:
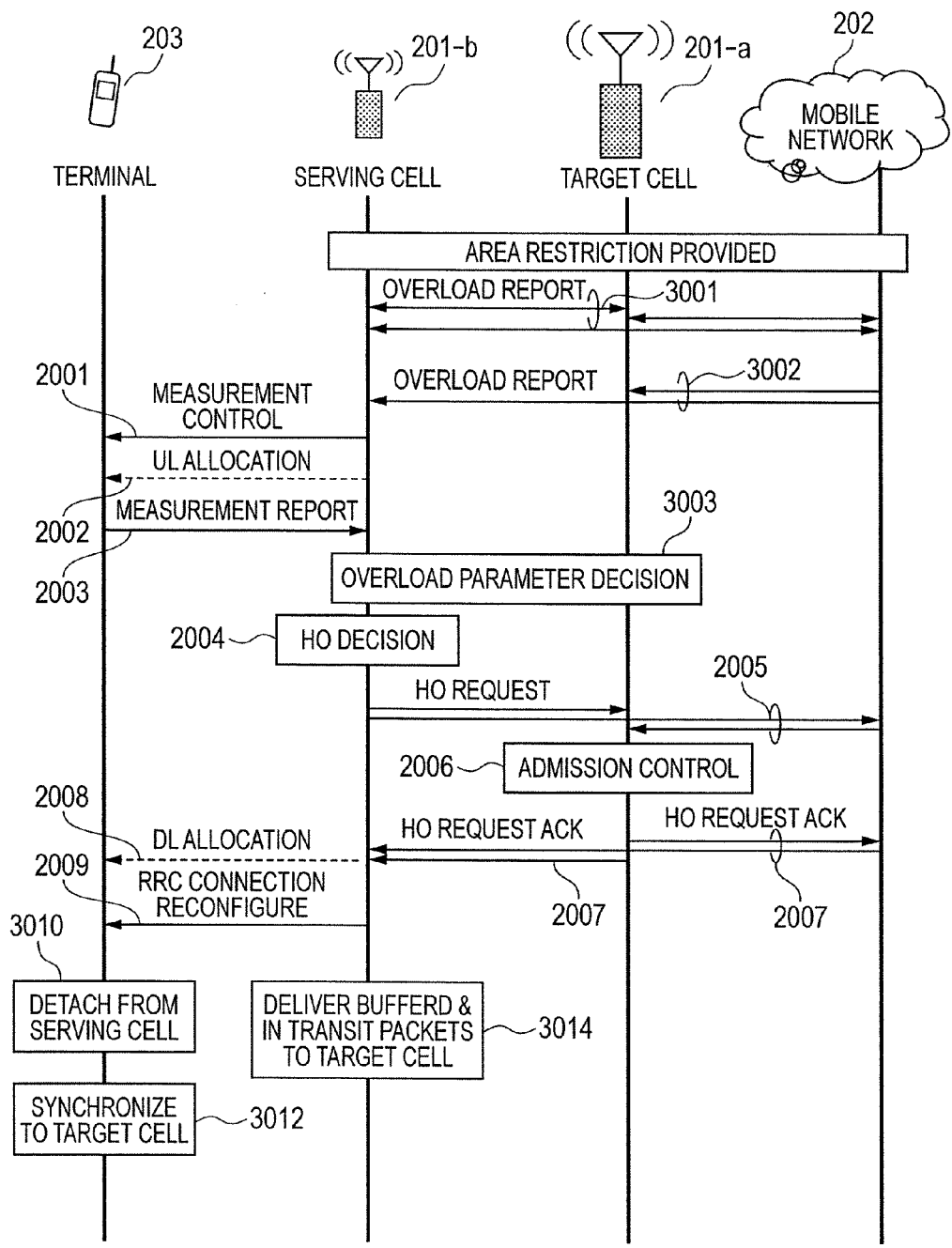
FIG. 6 is a diagram for explaining a handover sequence that includes load information exchanges.

FIG. 6 shows the details of a preparatory flow for switching the connection from the picocell base station (serving cell), to which the terminal currently belongs, to the handover-candidate macrocell base station (target cell), and this flow corresponds to Steps 1001 and 1002 in the flowchart of FIG. 5. The picocell holds position information of a handover-candidate base station, which is a candidate for the handover-destination of the terminal, and performs handover of the terminal according to the following control steps.

In an overload report process in Step 3001, the picocell 201-b reports the load information of the own cell to corresponding one of the base station management devices 204 on the mobile network 202. In addition to reporting the load information of the own cell, the picocell 201-b may inquire of the base station management device 204 about the load information of the macrocell. The macrocell 201-a may also perform a similar process.

Examples of the load information include the radio resource use rate, the hardware use rate, the number of terminal connections, and the type of traffic.

Note that examples of the type of traffic include real-time traffic, such as VoIP and Gaming, and best-effort traffic, such as FTP. The scheduling method is different between the real-time traffic and the best-effort traffic. When radio resources are allocated, a high load is generally imposed on the real-time traffic, and thus the percentage of the real-time traffic can be weighted by taking account of the load. Further, the base stations exchange communication messages with terminals through RRC (radio resource control). The number of pieces of RRC connection information may be approximated to the number of terminal connections to obtain statistical data. If there is an interface to directly connect the picocell 201-b and the macrocell 201-a, they may use this interface to send their own load information to each other.

In Step 3002, if the base station management device 204 manages logs of the load information, the base station management device 204 sends the load information to the base stations via the mobile network 202 periodically or as requested from the base stations.

In an overload parameter decision process in Step 3003, the picocell updates a parameter used for handover based on the load information of the macrocell, and the macrocell updates the load information of the own cell.

In a measurement control process in Step 2001, the picocell issues, to the terminal, an instruction to measure the signal quality of signals received from the picocell and the macrocell and to report the quality. In some cases, a plurality of macrocells exist.

In a UL allocation process in Step 2002, the picocell allocates a resource to the terminal in order for the terminal to send a measurement report in Step 2003.

In a measurement report process in Step 2003, the terminal reports the results of measurement of the signal quality of signals received from the picocell and the macrocell. The signal quality is indicated by, for example, the received power intensity, the signal to interference and noise ratio (SINR), or the path loss calculated from the difference between transmission power information and the received power intensity, and is information about the communication quality between the base station and the terminal.

In an HO decision process in Step 2004, the picocell compares the signal quality reported by the terminal with a signal quality threshold serving as a criterion for handover. If the signal quality of a signal received from the macrocell exceeds the signal quality threshold, the picocell performs processing of handing over the terminal to the macrocell. The signal quality threshold, serving as a handover criterion value, may be a fixed value or may be specified by the base-station upper-layer device 205. Alternately, a value calculated autonomously or a value calculated statistically in the base-station upper-layer device 205 may be used.

In an HO (Handover) request process in Step 2005, the picocell inquires of the macrocell about the possibility of handover of the terminal. If there is an interface for allowing the picocell and the macrocell to directly communicate, the interface may be used. If there is no such an interface, the picocell sends the inquiry to the macrocell through the base-station upper-layer device 205 via the mobile network 202.

In an admission control process in Step 2006, the macrocell determines whether to newly accept the terminal. The load information is used as a criterion for the determination. As the load information, the RB (resource block) use rate, the type of traffic, the number of terminal connections, the number of bearers, or the hardware use rate can be used. If the load information reaches a given value after newly accepting the terminal, the acceptance of the terminal is rejected.

In an HO request acknowledgement process in Step 2007, when it is determined in the admission control process that the terminal can be accepted (Ack), the macrocell notifies the picocell of that result. As in Step 2005, if there is an interface prepared between the picocell and the macrocell, the interface may be used for the notification. If there is no such an interface, the result is notified to the picocell through the base-station upper-layer device 205.

In a DL allocation process in Step 2008, when an HO request acknowledgement is fed back from the macrocell, the picocell performs RB allocation for the preparation of notification of an RRC connection reconfiguration process in Step 2009.

In the RRC connection reconfiguration process in Step 2009, the picocell notifies the terminal of information used for the handover to the macrocell.

Through the above-described steps, the preparation for the handover has been completed. The terminal disconnects the connection from the picocell (3010) and is synchronized with the macrocell (3012). The macrocell takes over, from the picocell, buffer data that was held for the terminal and packets being transmitted (3014).

The details of the respective steps of FIG. 6 will be described below for each of the base stations and the base station management device 204.

Figure 8:
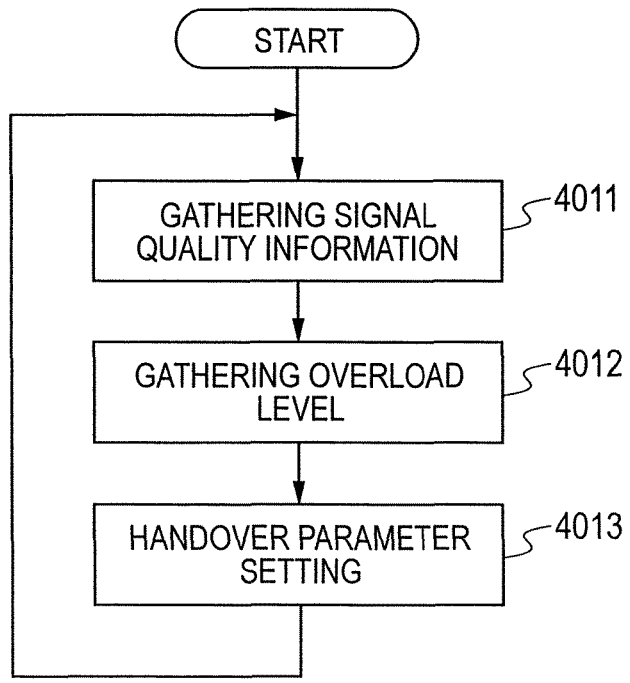
FIG. 8 is a diagram for explaining a handover parameter updating method used by a picocell.

FIG. 8 is a flowchart of handover parameter updating in the picocell, which corresponds to Step 3003 of FIG. 6. As shown in FIG. 4, a plurality of candidates for the handover destination from the picocell exist in some cases. In Step 4011, the picocell gathers information about the signal quality of signals received from the own cell and the handover-candidate base station, reported by the terminal (Steps 2001 to 2003). The signal quality can be indicated by the received power intensity, the signal to interference and noise ratio (SINR), or the path loss calculated from the difference between transmission power information and the received power intensity.

In Step 4012, the picocell gathers load information of the macrocell. If there is an interface prepared between the picocell and the macrocell, the interface may be used to notify and gather the load information. If there is no such an interface, the load information is notified and gathered through the base-station upper-layer device 205.

In Step 4013, the picocell specifies the handover criterion value used to determine a handover destination, by using the quality information gathered in Step 4011 and the load information gathered in Step 4012. The handover criterion value may also be used to select a terminal to be handed over. When the signal quality at the terminal does not reach the signal quality threshold, serving as the handover criterion value, obtained from a fixed value or a statistical value, the terminal may be selected as a candidate to be handed over.

FIG. 13 shows an effective path loss table 1300. In FIG. 13, an effective path loss obtained by giving a predetermined offset to a path loss for each piece of the load information is defined as the handover criterion value. For example, a description will be given of a case in which the value of the path loss is used as signal quality information. When the path loss is used for handover criterion, there are some methods to choose handover target. For instance, target cell which has lowest pathloss can be selected, or any cells which have lower pathloss than threshold may be selected.

As shown in FIG. 13, for each of handover-destination cells (target cells 1, 2, and 3), a handover criterion is specified according to its load level (overload level). When the load is light, 5 is subtracted from the value of a path loss 1310, and, when the load is heavy, 5 is added thereto. In this way, an effective path loss 1350, serving as the handover criterion value, is adjusted. If it is possible to divide the load information into more detailed information and to handle it, the amount of offset to be given to the signal quality may be set to a more precise value accordingly. Of course, a value other than ±5 can also be used. A description has been given of the case where the path loss is used as the handover criterion; however, the received power intensity or SINR may be used as the handover criterion and similarly adjusted according to the load information.

Figure 15:
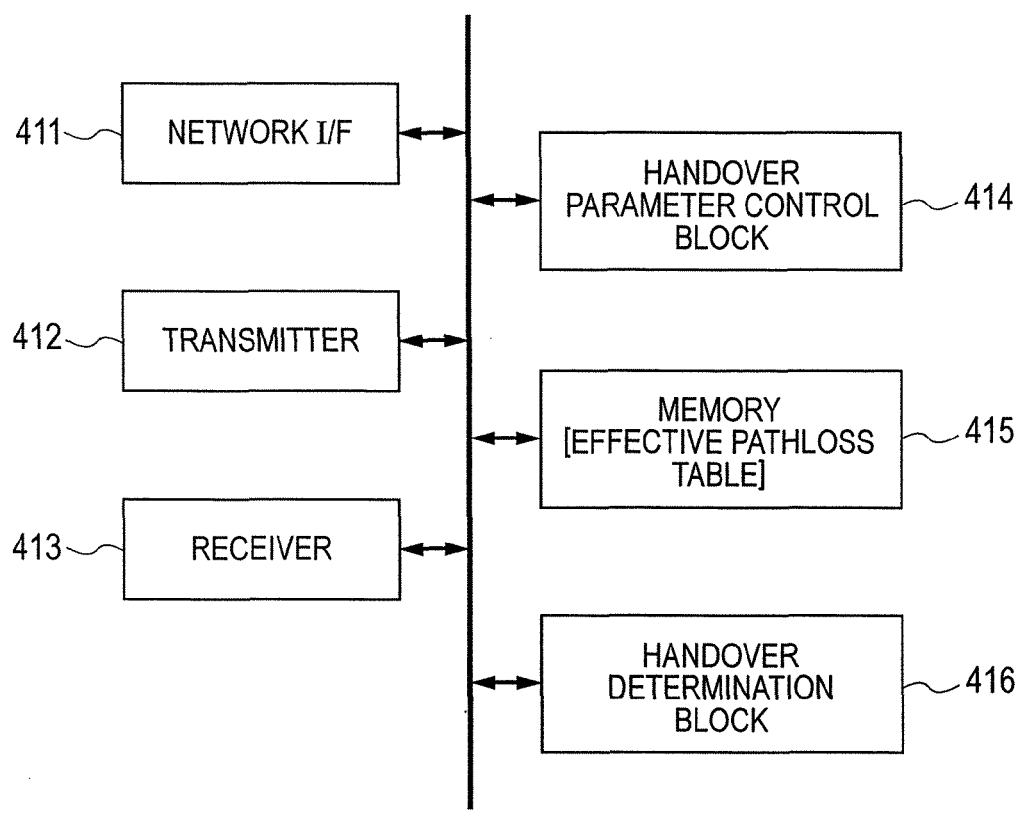
FIG. 15 is a diagram for explaining the device configuration of the picocell.

FIG. 15 is a diagram of the configuration of the picocell. A network interface block 411 manages an interface for performing communications with the base station management device 204, the base-station upper-layer device 205, or another base station. The network interface block 411 performs the load information gathering process in Step 4012.

A transmitter block 412 performs signal processing, such as error-correction cording and modulation processing, according to the wireless communication standard and sends a wireless signal to the terminal 203.

A receiver block 413 receives a wireless signal from the terminal 203 and performs demodulation processing, error-correction decoding, and the like. The receiver block 413 performs the signal quality information gathering process in Step 4011.

A handover parameter control block 414 performs handover parameter control based on information received from the network interface block 411, for example. Specifically, the handover parameter control block 414 performs processing corresponding to Step 4013. The effective path loss table 1300, which is obtained after adjustment of handover parameters, is stored in a memory 415. A handover determination block 416 determines a terminal 203 to be handed over or a target cell serving as a handover destination. Note that the handover parameter control block 414 and the handover determination block 416 may be each configured as hardware or may be each configured as a program stored in an external storage medium or a nonvolatile storage medium, read therefrom by a processor of the picocell, and performed by the processor.

Figure 9:
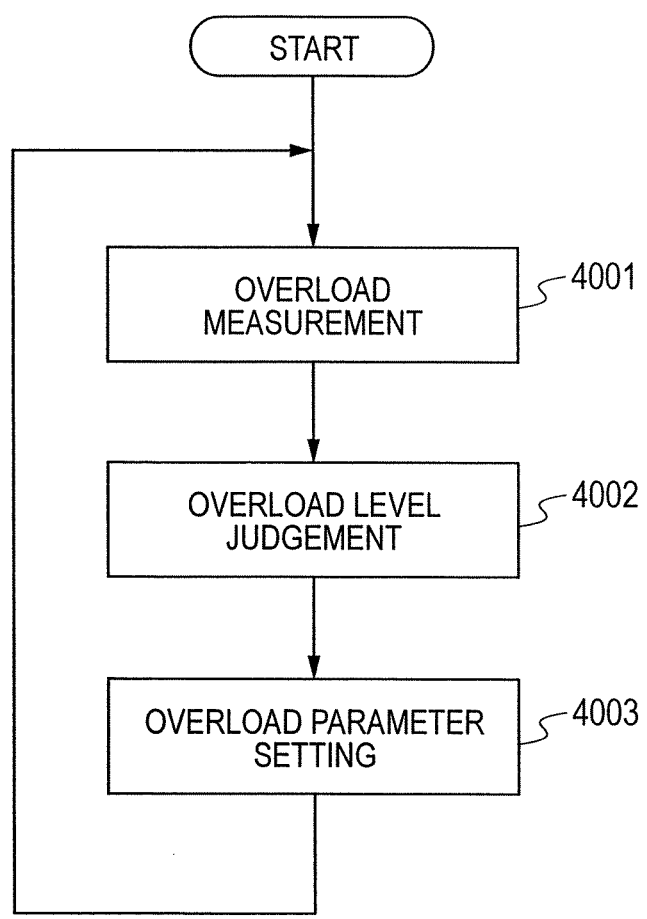
FIG. 9 is a diagram for explaining a scheduling parameter updating method used by a macrocell.

FIG. 9 is a flowchart of load information updating in the macrocell, which corresponds to Step 3003 of FIG. 6.

In Step 4001, the macrocell gathers, as load information, the radio resource use rate, the proportion of traffic types, and the number of terminal connections through the own-cell base station measurement or through the upper-layer device 205 and the base station management device 204 via the mobile network 202. In other words, base station can estimate load information by itself or take it from neighbor cells or management devices which gathers statistical information. For example, the macrocell may obtain, as the radio resource use rate, the statistical data on the amount of allocated radio resources when scheduling for the own cell is performed; or the base station management device 204 or the base-station upper-layer device 205 may gather information about the amount of used radio resources, obtain statistical data thereon, and notify it to the base station. Similarly, the base station may individually calculate the statistical data on the traffic types and the number of terminal connections. Alternately, the base station management device 204 may obtain logs and notify them to the base station.

For example, the scheduling method is different between the real-time traffic, such as VoIP and Gaming, and the best-effort traffic, such as HTTP and FTP. While radio resources are being allocated, a high load is generally imposed on the real-time traffic, and thus the percentage of the real-time traffic can be weighted by taking account of the load. Further, the base stations exchange communication messages with terminals through RRC (radio resource control). The number of pieces of RRC connection information may be approximated to the number of terminal connections to obtain the statistical data.

In Step 4002, the load information gathered in this way is judged by a plurality of threshold levels.

In Step 4003, a parameter is set according to the level of the load information judged in Step 4002. When the load is light, a parameter may be set so as to strongly apply power control and a resource allocation method. Specifically, a parameter may be set so as to suppress the target power of the power control for a cell-edge terminal. Further, a parameter may be set so as to allocate more radio resources when resource allocation is performed by the scheduler. When the load is intermediate, processing similar to the above-described processing can be performed. When the load is heavy, it is determined that the macrocell itself should be a non-target cell whose load should be reduced, and the above-described processing may be omitted.

FIG. 12 shows a scheduling mode table 1200 to be referred to when the judgment is performed in Step 4002. For each load level 1210, the amount of radio resource allocation 1230 and the amount of power control 1220 are held. As shown in FIG. 12, the load level 1210 is specified at three levels, namely, a light load (Light) 1250, an intermediate load (Middle) 1260, and a heavy load (Heavy) 1270. The load level 1210 may be specified at more detailed levels. To specify the load level 1210 at more than these three levels, operations are performed between the levels. For example, the amount of power control 1220 and the amount of radio resource allocation 1230 are adjusted according to a table such as that shown in FIG. 12.

Figure 16:
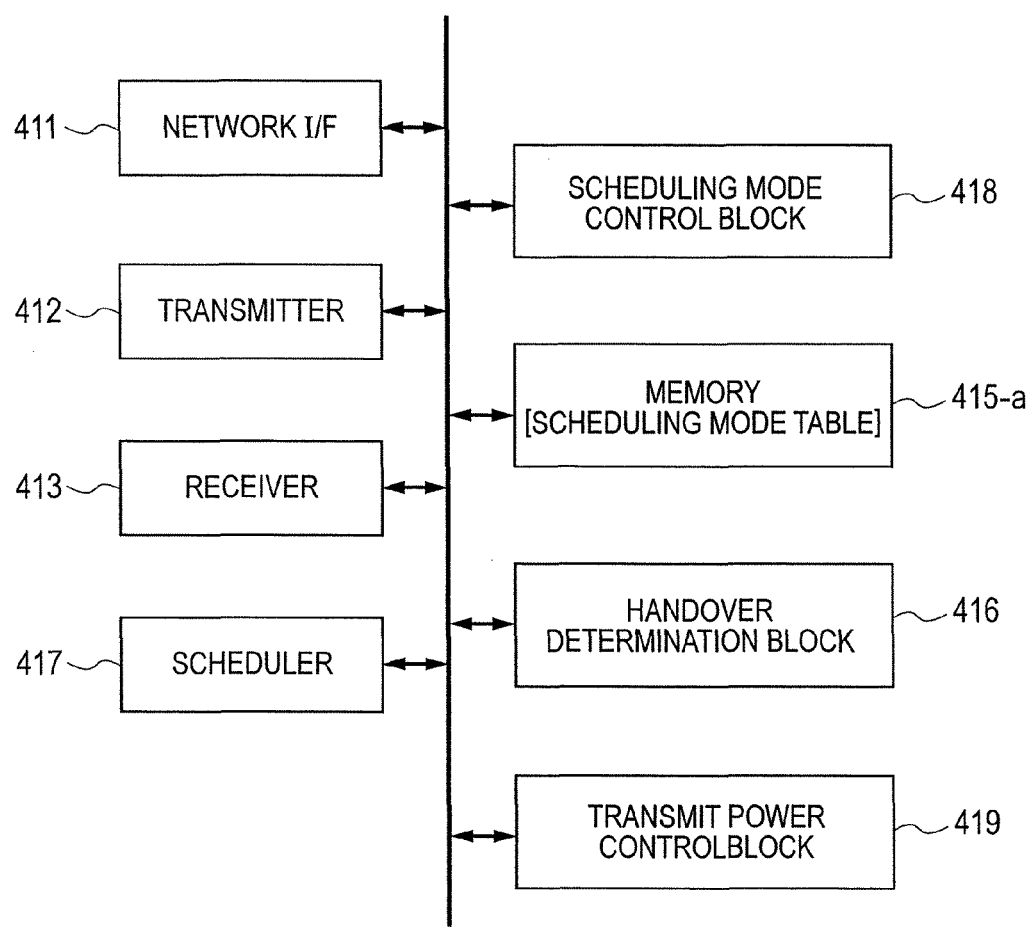
FIG. 16 is a diagram for explaining the device configuration of the macrocell.

FIG. 16 is a diagram of the device configuration of the macrocell. The network interface block 411 manages an interface for performing communications with the base station management device 204, the base-station upper-layer device 205, or another base station. The network interface block 411 performs the load information gathering process in Step 4001.

The receiver block 413 receives a wireless signal from the terminal 203 and performs demodulation processing, error-correction decoding, and the like. The receiver block 413 performs the signal quality information gathering process in Step 4011.

A scheduling mode control block 418 changes the mode of a scheduler block 417 and a transmit power control block 419 based on the load information. The relationships among the load information level, the amount of radio resource allocation, and the amount of power control, used here, are held in a memory 415-*a* as the scheduling mode table 1200 (FIG. 12). This processing corresponds to Step 4002.

The scheduler block 417 and the transmit power control block 419 performs scheduling. Specifically, when the load is light, the scheduler block 417 allocates an additional amount of radio resources, and the transmit power control block 419 suppresses the transmission power. This processing corresponds to Step 4003. The scheduler block 417, the scheduling mode control block 418, and the transmit power control block 419 may be each configured by hardware, or may be each configured as a program stored in an external storage medium or a nonvolatile storage medium, read therefrom, and performed by a processor.

Figure 10:
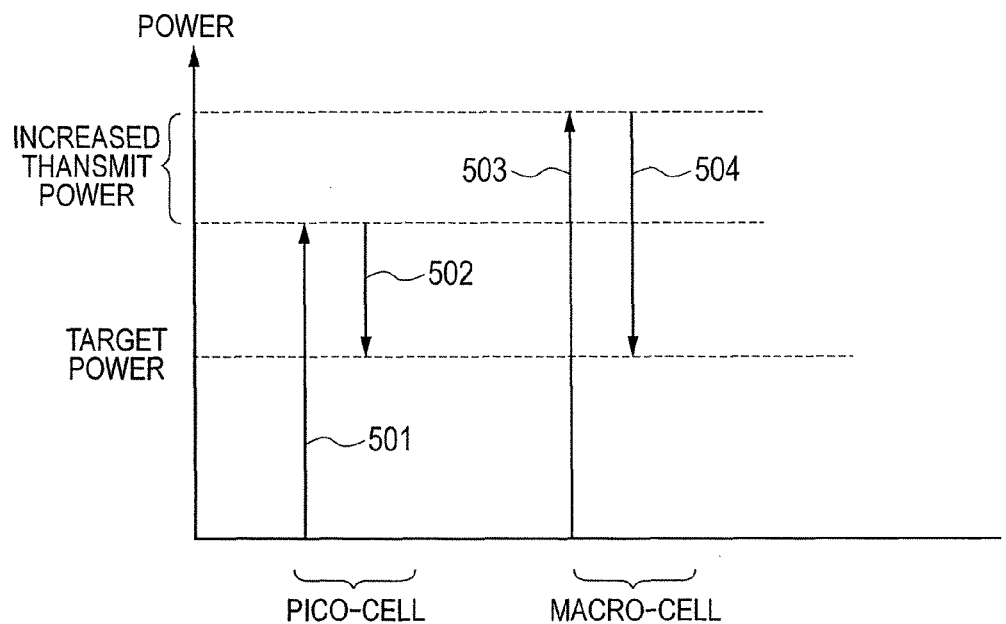
FIG. 10 is a diagram for explaining transmit power control performed to suppress interference.
Figure 11:
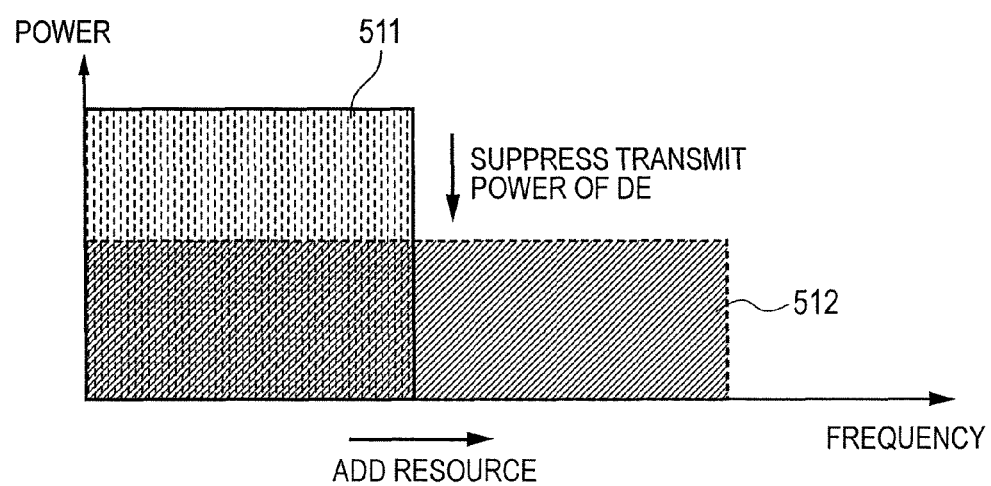
FIG. 11 is a diagram for explaining frequency scheduling performed to suppress interference.
Figure 14:
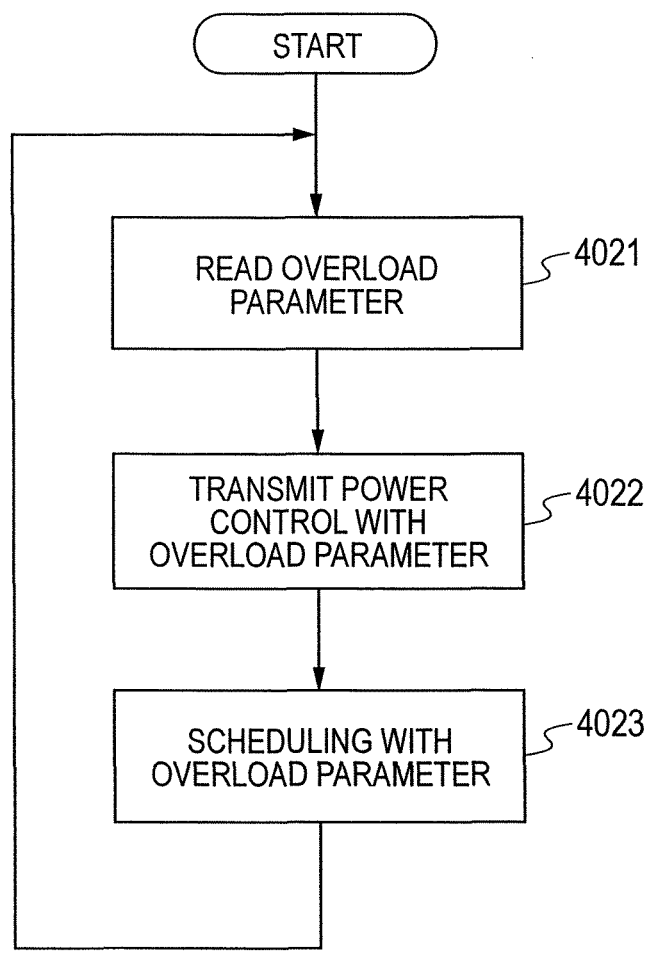
FIG. 14 is a diagram for explaining a scheduling method and power control according to the invention.

Steps 1003 and 1004 will be described using FIGS. 10, 11, and 14. The transmit power control performed for the terminal that has been moved to the cell edge of the macrocell through handover is important when interference control is taken into account. When the terminal is handed over from the picocell to the macrocell, in order to provide communications at a similar quality as the communications with the picocell, transmit power control needs to be performed so as to compensate for the difference between a path loss 502 for the picocell and a path loss 504 for the macrocell, as shown in FIG. 10. It is necessary to perform transmission at transmission power 503 that is obtained after the difference in path loss with respect to transmission power 501 required for the picocell is compensated for.

However, it is predicted that the transmission power 503 of the terminal that has been handed over to the macrocell becomes a large interference source for the picocell. Therefore, in this embodiment, this power is suppressed through power control. As shown in FIG. 11, in order to suppress the power, more radio resources are allocated. This is because an amount of signal power 511 required to complete transmission of a packet is constant, and an amount of signal power 512 obtained after the power is reduced is also a similar amount. Specifically, in transmit power control for terminals that include at least the handed-over terminal, the handover-destination base station reduces the amount of signal power 511 in the power (transmission power value) domain to suppress terminal transmission power and adds resources in the frequency domain as in the amount of signal power 512 to increase the number of terminals to be allocated.

The processing of associating the amount of power control and the amount of radio resource allocation with the load level of the macrocell will be described using FIG. 14.

In Step 4021, the amount of control change calculated from the load information through the control flow of FIG. 9 is read.

In Step 4022, power control is performed by taking account of the power control offset read in Step 4021. The power control offset for the target transmission power of the cell-edge terminal varies depending on the load level. The power may be reduced more as the load of the macrocell is lighter.

In Step 4023, the amount of increase in radio resource allocated to the cell-edge terminal varies depending on the load level. The amount of radio resource to be allocated may be increased as the load of the macrocell is lighter. Note that the processing of Steps 4022 and 4023 may be preferentially performed for the terminal handed over to the macrocell for the purpose of load balancing. As described above, load balancing and a reduction in interference power can be achieved by performing the flow shown in FIG. 5.

Figure 7:
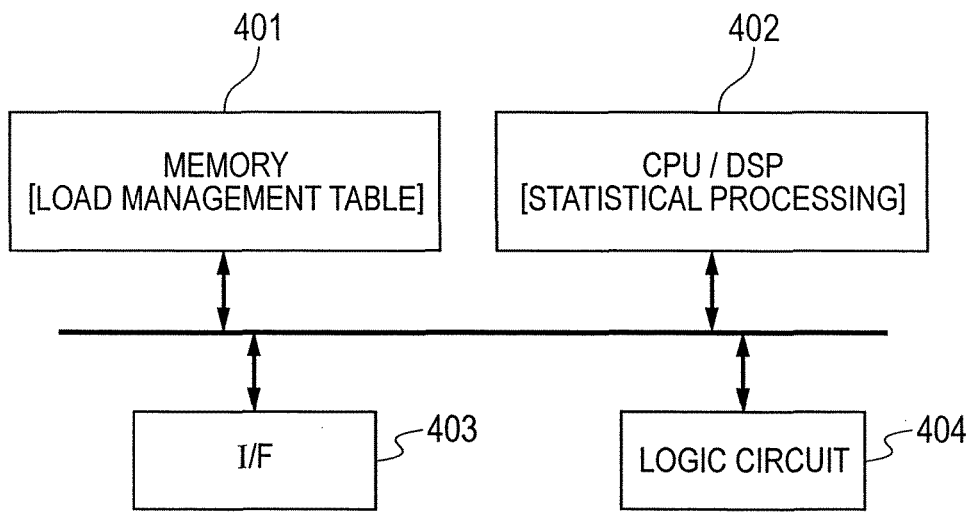
FIG. 7 is a diagram showing the configuration of a base station management device.

FIG. 7 shows the device configuration of the base station management device 204. The base station management device 204 includes a memory 401, a CPU/DSP 402, an external interface 403, and a logic circuit 404 and gathers and controls information about a plurality of base stations.

In the memory 401, pieces of load information gathered from management-target base stations are stored in a load management table. The CPU/DSP 402 performs statistical processing of the load information. Information obtained after the statistical processing is stored again in the load management table in the memory 401. Therefore, the load management table stores the load information just gathered and the load information for which time-sequential logs have been recorded. The base station management device 204 of this embodiment obtains statistical data on the load information gathered from the base stations and delivers necessary load information to the base stations 201 (Step 3002).

The logic circuit 404 performs the operations in Steps 3001 and 3002. When an instruction to report load information is issued to the base stations, the logic circuit 404 or the CPU/DSP 402 sends the instruction via the external interface 403. The external interface 403 is connected not only to the base stations but also to other devices via the mobile network 202. If it is necessary to exchange information between the base stations, the external interface 403 may be used.

As in the embodiment described above, a scheduling method for reducing interference by setting or changing the criterion for handover is provided, which leads to an effect that the number of terminal connections and the amount of interference are balanced between cells in the communication system. Further, there is an effect that load balancing is achieved by facilitating handover (HO) from a cell having a heavy terminal-connection load to a cell having a light terminal-connection load. Furthermore, there is an effect that interference between cells is minimized. The above-described embodiment affords at least one of these effects.

What it claimed is:

1. A wireless communication system comprising:
   a first base station capable of communicating with terminals belonging to a first communication range; and
   a second base station capable of communicating with terminals belonging to a second communication range that includes a region overlapping with the first communication range and that has a different size from the first communication range,
   wherein the first base station and the second base station each include:
   a load information acquisition section that acquires load information of at least one of the first base station and the second base station,
   a handover control section that determines, based on the load information, whether it is necessary to hand over any terminal located in the overlapping region between the first base station and the second base station, and controls handover of the terminal,
   the first communication range is smaller than the second communication range, and
   the second base station suppresses transmission power for the terminals that include the handed-over terminal and adds resources in the frequency domain.

2. The wireless communication system according to claim 1,
   wherein the load information acquisition section of the first base station further acquires the load information of the second base station; and
   wherein the handover control section of the first base station determines whether to hand over the terminal, based on the load information of the first base station and the load information of the second base station.

3. The wireless communication system according to claim 2, wherein the handover control section of the first base station specifies a condition for handover based on the load information of the second base station.

4. The wireless communication system according to claim 3, wherein the condition for handover includes at least one of a path-loss threshold and the number of terminals to be handed over.

5. The wireless communication system according to claim 1, wherein the load information of the second base station includes at least one of: the number of terminals belonging to at least one of the first communication range and the second communication range; the number of terminals located in the overlapping range; and the type of traffic used by an application used by the terminal.

6. The wireless communication system according to claim 1,
   wherein the first base station configures a picocell or a microcell; and
   wherein the second base station configures a microcell.

7. The wireless communication system according to claim 1, wherein the handover control section of the first base station sends to the second base station a handover request for any terminal and, when an acknowledgement of the handover request is received from the second base station, performs handover.

8. The wireless communication system according to claim 1, further comprising:
   a base station management device connected to the first base station and the second base station,
   wherein the base station management device gathers load information from at least one of the first base station and the second base station; and
   wherein the first base station inquires the base station management device about the load information of the second base station.

9. The wireless communication system according to claim 1, wherein an effective path loss, serving as the handover criterion value, is adjusted according to the load information for each handover-destination cell.

10. The wireless communication system according to claim 1, wherein a level at which the second base station suppresses transmission power and adds resources in the frequency domain increases as the load information of the second base station decreases.

11. A second base station capable of communicating with terminals belonging to a second communication range that includes a region overlapping with a first communication range in which a first base station and terminals can communicate with each other and that is smaller than the first communication range, the second base station comprising:
   a load information acquisition section that externally acquires load information of the first base station;
   a quality information acquisition section that acquires quality information about communication quality from any terminal located in the overlapping region; and
   a handover control section that determines whether to hand over the terminal located in the overlapping region based on the load information and the quality information and controls handover of the terminal,
   wherein the first base station suppresses transmission power for the terminals that include the handed-over terminal and adds resources in the frequency domain.

12. The second base station according to claim 11, wherein the handover control section specifies a condition for performing the handover, based on the load information and controls the handover according to the condition.

13. A load balancing aware handover method for a terminal between a plurality of base stations, comprising the steps of:
   in a first base station capable of communicating with terminals belonging to a first communication range, acquiring, from a terminal located in a region overlapping with a second communication range in which a second base station can perform communication, quality information about communication quality between the terminal and the first base station;
   in the first base station, acquiring load information of the second base station;
   determining whether to hand over the terminal located in the overlapping region between the first base station and the second base station, based on the quality information and the load information, and controlling handover of the terminal terminal;
   suppressing transmission power, by the second base station, for the terminals that include the handed-over terminal, and
   adding resources in the frequency domain by the second base station,
   wherein the first communication range is smaller than the second communication range.

* * * * *